A. E. NEWTON & F. K. HENDRICKSON.
DROP TABLE MECHANISM FOR MILLING MACHINES.
APPLICATION FILED NOV. 23, 1915.
1,213,237.
Patented Jan. 23, 1917.
2 SHEETS—SHEET 2.
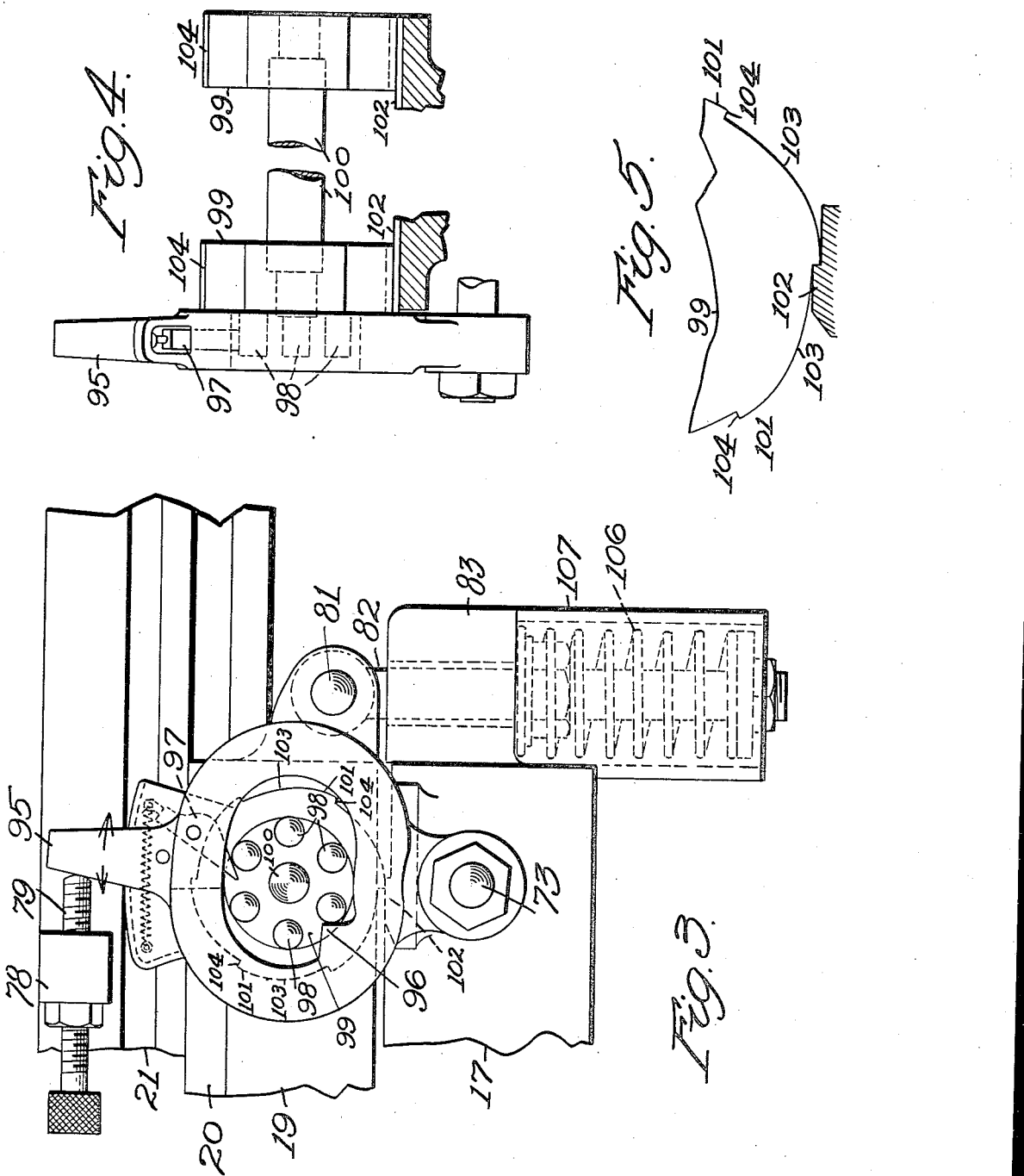

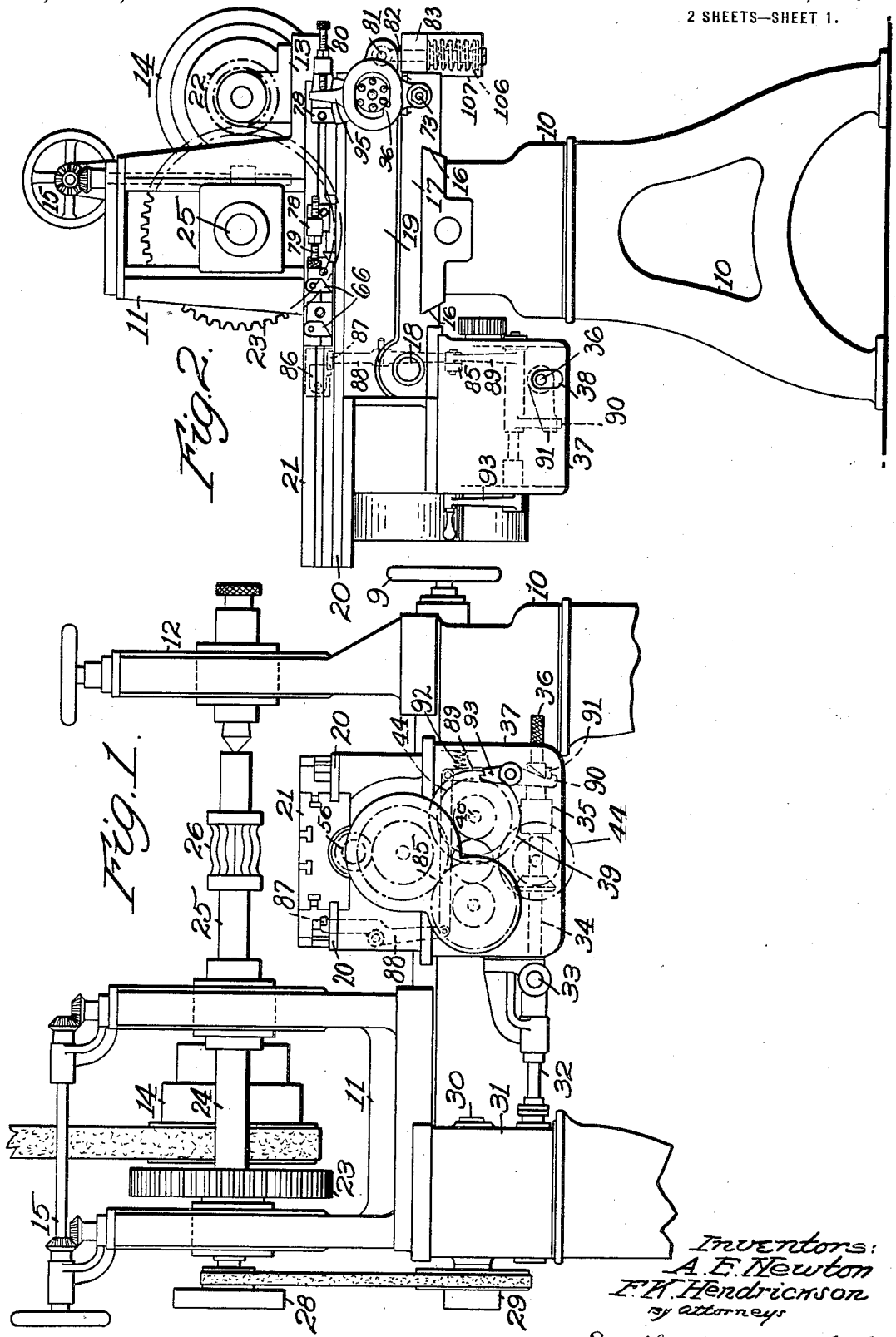

UNITED STATES PATENT OFFICE.

ALBERT E. NEWTON AND FRED K. HENDRICKSON, OF WORCESTER, MASSACHUSETTS, ASSIGNORS TO REED-PRENTICE COMPANY, A CORPORATION OF MASSACHUSETTS.

DROP-TABLE MECHANISM FOR MILLING-MACHINES.

1,213,237.      Specification of Letters Patent.      Patented Jan. 23, 1917.

Original application filed December 29, 1914, Serial No. 878,270. Divided and this application filed November 23, 1915. Serial No. 63,111.

*To all whom it may concern:*

Be it known that we, ALBERT E. NEWTON and FRED K. HENDRICKSON, citizens of the United States, both residing at Worcester, in the county of Worcester and State of Massachusetts, have invented a new and useful Drop-Table Mechanism for Milling-Machines, of which the following is a specification.

This invention relates to a milling machine and the principal objects thereof are to provide an arrangement for dropping the table in such form that it is simplified and rendered less expensive to make and keep in condition than has been the case with table drop devices with which we are familiar; and to provide simple and practicable means for dropping the table in such a way as to take little time and necessitate a short travel of the sliding table and of the operating lever in order to cause the table to drop. In this way the operating lever can be engaged by the actuating stop on the sliding table before the cutting operation is completed and dropped suddenly when the cutting operation is finished and immediately reversed if desired.

The invention also involves improvements in details of construction and combinations of parts as will appear.

Reference is to be had to the accompanying drawings in which—

Figure 1 is a front elevation of a milling machine of the Lincoln type showing a preferred embodiment of this invention applied thereto; Fig. 2 is an end elevation of the same; Fig. 3 is a view similar to Fig. 2 on enlarged scale showing a part only of the mechanism; Fig. 4 is a rear elevation of the same, and Fig. 5 is an end view of the cam thereof showing in section the surface on which it rests.

The invention is shown as applied to a milling machine having a bed or frame 10 on which are supported a head stock 11 and tail rest 12, the latter not appearing in Fig. 2. Carried with the head stock are bearings for a cone pulley 14 to which power is transmitted from a counter shaft. Ordinary mechanism 15 is shown for raising and lowering the head center.

On the bed are located ways 16 on which is adjustably mounted as usual a carriage 17, movable longitudinally with respect to the driving spindle by a screw and hand wheel 9. Pivoted on a stud 18 on this carriage is a drop table or work table support 19 having ways 20 for the sliding work table 21.

On the shaft on which the cone pulley 14 is located is a small gear or pinion 22 meshing with a gear 23 on the driving spindle 24 which is provided with means for centering and driving the cutter spindle 25. A cutter 26 is shown on this spindle. The other end of this spindle is supported as usual by a tail center carried by the tail rest 12. Also shown on the shaft of the cone pulley are a pair of pulleys 28 for driving pulleys 29 on a shaft 30. This shaft 30 is mounted in a gear feed change box 31 for driving (by any ordinary gearing) a shaft 32 which is connected by a knuckle joint 33 with a table driving shaft 34 which is provided with a worm 35 and a handle 36. This shaft 34 accordingly is capable of swinging on the knuckle joint as a center. The gear box 37 in which it is located is provided with a slot 38 for limiting its downward motion. The worm 35 meshes with a worm wheel 39 loosely mounted on a shaft 40 in this gear box 37. The shaft 40 by means of gears 44 drives a feed screw 56 meshing with a nut (not shown) on the work table 21 for operating the same.

The table is provided with a pivoted dog 86 adapted to engage the end 87 of a lever 88 on the rear side of the machine. This lever is connected by a link 85 with a drop work lever 89 having a projection 90 on the bottom for engaging an arm 91 supporting the table driving shaft. However, when the dog 86 operates this arm 87 to push it out, the lever 89 will be operated to release the shaft 34 and allow it to drop away to its lowermost position where the gears 44 will be out of mesh. The lever 89 can be operated by hand through a handle 93. It is to be noted that the work table is provided as usual with swinging dogs 66 and with reversing dogs for controlling the forward and back motions of the table.

One of the main features of this invention relates to the drop of the table 19. This drop table is capable of a swinging motion at the end sufficient to drop the work down after the cut is made and allow it to feed back with the work out of contact with the cutter. This is accomplished by a lever 95 pivoted on a stud 73 on the carriage 17. When the lever 95 is in vertical position as shown in Fig. 2 the table is raised to its highest position but when the lever is moved out to the right it causes the table to drop slightly. For the purpose of operating this lever the work table 21 is provided with two arms 78 and on these are mounted adjustable stops 79 and 80 for engaging the end of this lever 95 at opposite ends of the travel of the table. In the position shown in Fig. 2 the stop 80 has just engaged the lever 95 and moved to its upright position, thus forcing the table up ready for the cutting stroke. This lever 95 is provided with two members, a projection 96 and a spring-controlled pawl 97, for operating studs 98 projecting from the face of a rotary cam member 99. This cam member is mounted on a shaft 100 which has a similar cam member and set of duplicate parts on the other end. The cam member is provided with a number of projecting surfaces 101 equal in number to the number of studs 98, and these are designed to rest on a raised surface 102 on the carriage which has an abrupt drop at one end, and an incline at the other. The surfaces 101 are all concentric with the shaft 100 but they drop off slightly to form non-concentric cam surfaces 103, each of which is connected with the next concentric surface 101 by a preferably radial surface 104.

It is to be noted that the drop table is provided with a stud 81 on which is hung a screw 82 having a nut on the bottom. The carriage 17 is provided with a perforated ear 83 through which this screw passes. The screw 82 is shown as provided with a stiff spring 106 located in a cylinder 107. The spring bears on the bottom of the ear. The nut is adjusted up to the proper position to cause it to bind yieldingly when the table is raised to its highest position, thus securely holding it against chattering during the working stroke.

The operation is as follows:—Assuming that the driving shaft 34 is down in inoperative position, it will be understood that it is being driven by power and that the cutter 26 is rotating. The work table is back away from the cutter but not in its extreme rear position.

In order to start the operation the only thing necessary is to grasp the handle 36 and raise the worm 35 until it meshes with the worm wheel 39. Then the projection 90 is automatically moved into position by a spring 92 to hold up the shaft until released. The table thus starts forward at full speed. When the table moves into such position that the stop 79 engages the lever 95 and swings it to the right, the projection 96 engages one of the studs 98 and turns the shaft 100 far enough to turn the surface 104 past the abrupt end of the surface 102 so as to allow the shaft, and consequently the drop table which carries the shaft, to drop. Upon the other stroke when the stop 80 engages and operates the lever 95 in the opposite direction the pawl 97 is caused to engage another one of the studs 98 and to positively turn the shaft 100 in the same direction an equal distance. This results in lifting the next surface 103 upon the surface 102 until the concentric surface 101 rests thereon. In this way the table is raised and held at a definite height.

As this is a division of our prior application for patent having the same title, filed Dec. 29, 1914, Ser. No. 878,270 we have not shown or described the driving and reversing gearing herein nor the mechanism which controls it.

Although we have illustrated and described, our invention as applied only to the Lincoln type of milling machine and have shown only a single form of the invention we are aware of the fact that many modifications can be made therein without departing from the scope of the invention as expressed in the claims, and that it can be applied to other types of milling machines. Therefore, we do not wish to be limited to this particular type of machine, or to all the details of construction herein shown and described except as defined by the appended claims, but What we do claim is:—

1. In a milling machine, the combination with a drop table and a movable work table thereon, of positive means for raising, comprising a lever, means carried by the work table for operating said lever, a cam member adapted to turn and arranged to support the drop table, and means operated by said lever for turning the cam into a position to drop or raise the drop table.

2. In a milling machine, the combination with a drop table and a sliding work table thereon, of a rotatable cam carried by the drop table and supporting it, means for supporting the cam, and means operated by the sliding table for turning the cam through a part of a revolution at each end of the stroke to raise and drop the drop table.

3. In a milling machine, the combination of a drop table, a carriage for supporting it having a raised surface, a sliding work table on the drop table, a cam provided with a plurality of projecting surfaces therearound adapted to rest on said raised surface, said cam supporting one end of the drop table, and means for rotating said cam through an arc at each end of the stroke of the sliding table, for raising and dropping the drop table.

4. In a milling machine, the combination with a carriage and a reciprocatory work table, said carriage having a supporting surface for the work table, of means whereby the work table is supported at one end from said surface in operative position during the operative stroke, and means whereby said last named means is moved to allow the table to drop from said supporting surface at the end of the working stroke.

5. In a milling machine, the combination of a drop table, a carriage for supporting it having a raised surface, a sliding work table on the drop table, a cam provided with a plurality of equally spaced projecting surfaces therearound each adapted to rest in turn on said raised surface as the cam turns, said cam supporting one end of the drop table, and means for rotating said cam through an arc equal to one half the distance between two of said projections at each end of the stroke of the sliding table, for raising and dropping the drop table.

6. In a milling machine, the combination of a drop table, a carriage for supporting it having a raised surface, a sliding work table on the drop table, a cam provided with a plurality of projecting surfaces therearound adapted to rest on said raised surface, said cam supporting one end of the drop table, means for rotating said cam through an arc at each end of the stroke of the sliding table, for raising and dropping the drop table, said means comprising a lever having a projection movable therewith and a series of pins connected with the cam and located in the path of the projection on the lever.

7. In a milling machine, the combination of a drop table, a carriage for supporting it having a raised surface, a sliding work table on the drop table, a cam provided with a plurality of projecting surfaces therearound adapted to rest on said raised surface, said cam supporting one end of the drop table, means for rotating said cam through an arc at each end of the stroke of the sliding table, for raising and dropping the drop table, and means for yieldingly holding the cam down on said raised surface.

8. In a milling machine, the combination with a work table, a cutter spindle, and means for reciprocating the table, of means whereby the table will be raised and held in raised operative position, and yielding means for holding the table against moving upwardly from its raised position to prevent chattering.

In testimony whereof we have hereunto set our hands.

ALBERT E. NEWTON.
FRED K. HENDRICKSON.